United States Patent
Levy et al.

(10) Patent No.: US 9,571,315 B2
(45) Date of Patent: Feb. 14, 2017

(54) SENSOR SYSTEMS AND METHODS UTILIZING BAND PASS FILTER TUNING

(71) Applicant: Infineon Technologies AG, Neubiberg (DE)

(72) Inventors: David Levy, Wernberg (AT); Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/022,728

(22) Filed: Sep. 10, 2013

(65) Prior Publication Data

US 2015/0071369 A1    Mar. 12, 2015

(51) Int. Cl.
*H04B 15/00*   (2006.01)
*H04L 27/148*   (2006.01)
*H04B 1/713*   (2011.01)
*H04B 3/02*   (2006.01)

(52) U.S. Cl.
CPC ............. *H04L 27/148* (2013.01); *H04B 1/713* (2013.01); *H04B 3/02* (2013.01)

(58) Field of Classification Search
CPC .................................................. H04L 27/148
USPC ................................ 375/285, 272, 224–227
See application file for complete search history.

(56) References Cited

U.S. PATENT DOCUMENTS

| | | | |
|---|---|---|---|
| 5,128,625 A * | 7/1992 | Yatsuzuka et al. ........... 327/156 |
| 6,243,004 B1 | 6/2001 | Flick | |
| 6,411,075 B1 * | 6/2002 | Battiston et al. .......... 324/76.39 |
| 6,563,761 B1 * | 5/2003 | Schaffran ............... B60N 2/002 |
| | | | 280/735 |
| 6,959,356 B2 | 10/2005 | Packwood et al. | |
| 7,289,637 B2 * | 10/2007 | Montag ................ H04R 29/001 |
| | | | 381/103 |
| 7,304,401 B2 | 12/2007 | Enders et al. | |
| 7,349,347 B2 | 3/2008 | Yanagida et al. | |
| 7,454,170 B2 | 11/2008 | Goossens et al. | |
| 7,725,096 B2 | 5/2010 | Riveiro et al. | |
| 7,783,260 B2 * | 8/2010 | McCallister et al. ......... 375/227 |
| 7,920,585 B2 * | 4/2011 | Mizutani ...................... 370/437 |
| 7,978,600 B2 | 7/2011 | Itabashi et al. | |
| 8,428,154 B2 | 4/2013 | Ishiko | |
| 8,478,212 B2 | 7/2013 | Moon et al. | |
| 8,990,464 B2 * | 3/2015 | Kessler ............... G06F 13/4295 |
| | | | 710/104 |
| 9,042,295 B1 * | 5/2015 | Balter ................ H04B 7/18515 |
| | | | 370/317 |
| 2011/0064126 A1 | 3/2011 | Ishiko | |
| 2011/0086606 A1 * | 4/2011 | Chen et al. ................... 455/323 |
| 2012/0140793 A1 * | 6/2012 | Demessie et al. ............ 375/130 |

(Continued)

OTHER PUBLICATIONS

U.S. Appl. No. 13/933,652, filed Jul. 2, 2013. 27 Pages.
Non Final Office Action Dated Mar. 22, 2016 U.S. Appl. No. 13/933,652.

*Primary Examiner* — Qutbuddin Ghulamali
(74) *Attorney, Agent, or Firm* — Eschweiler & Associates, LLC (57) ABSTRACT

A communication system having a configurable bandpass filter is disclosed. The system includes a bandpass filter and a bandpass controller. The bandpass filter has an adjustable center frequency. The bandpass controller is configured to identify a frequency shift in a master in or received signal and to shift the center frequency of the bandpass filter according to the identified frequency shift.

13 Claims, 6 Drawing Sheets

(56) References Cited

U.S. PATENT DOCUMENTS

2012/0300823 A1\* 11/2012 Petrovic .............. H03M 1/0614
 375/224
2015/0009256 A1\* 1/2015 Bildstein et al. ............... 347/16
2015/0012767 A1 1/2015 Levy et al.
2015/0071369 A1 3/2015 Levy et al.
2015/0318694 A1 11/2015 Stevens \* cited by examiner

406 ⟶ Initialization phase:
　　For s=1 to nbr_sens
　　　　For bin=1 to nbr_bin
　　　　　　For fr=1 to 20
　　　　　　　　Sensor s sends frame to Master
　　　　　　　　Master adapts its central frequency to increase signal strength
　　　　　　End
　　　　End
408 ⟶ End
　　For s=1 to nbr_sens
　　　　For bin=1 to nbr_bin
　　　　　　Master sends frame to Sensor s
　　　　　　Sensor s reports in response frame the signal strength
　　　　　　Master adapts its PLL transmit frequency
　　　　　　If signal strength is optimal then
　　　　　　　　Inform Sensor to send next frame on next bin
　　　　　　End
　　　　End
　　End
410 ⟶ Runtime:
　　Sensor s sends frame to Master
　　Master adapts its central frequency to increase signal strength
　　Master sends frame to Sensor s
　　Sensor s reports in response frame the signal strength
　　Master adapts its PLL transmit frequency

SENSOR SYSTEMS AND METHODS UTILIZING BAND PASS FILTER TUNING

BACKGROUND

Automotive systems are complex systems that include computers and components to operate and monitor automotive vehicles. The systems typically include a processor that controls and monitors engine operation and the like. The system generally operates various control systems that perform automotive functions. By monitoring, minor problems can be identified and corrected before becoming major problems.

Automotive systems typically use a dual purpose bus to mitigate wiring and cost. The bus provides power to sensors and components and also is used for data transmission. Generally, attempts to improve providing of power degrade data transmission and, similarly, attempts to improve data transmission degrade providing of power.

DETAILED DESCRIPTION

The present invention will now be described with reference to the attached drawing figures, wherein like reference numerals are used to refer to like elements throughout, and wherein the illustrated structures and devices are not necessarily drawn to scale.

Systems and methods are disclosed that facilitate automotive systems and related systems. The communication between components, such as sensors and controllers, is facilitated by modulating communications or data transmission to selected frequency bins and enhanced by tuning band pass filters and transmission frequencies.

Data is exchanged between a master component and sensors at a fixed and know frequency. Each frame can be transmitted at a different frequency to avoid noise and/or interference. The master component and sensors hop from frequency to frequency to facilitate communication.

The master component and the sensors include a receiver for receiving data or communication and a transmitter for transmitting data or communication. The receiver of the master component includes a configurable/tunable bandpass filter to tune to or pass only frequency range associated with the frequency used for transmitting. The bandpass filter is tuned as shown below to permit a relatively narrow pass band for communicating. Without tuning, relatively larger pass bands are required, which limits the number of channels available for communication and can also introduce noise or other distortions due to the larger pass band.

The transmitter of the master component generally includes a configurable fine frequency component to facilitate transmission of data from the master. The fine frequency component is configured to adjust a center frequency for transmission according to receiver characteristics at slave or sensor components.

Figure 1:
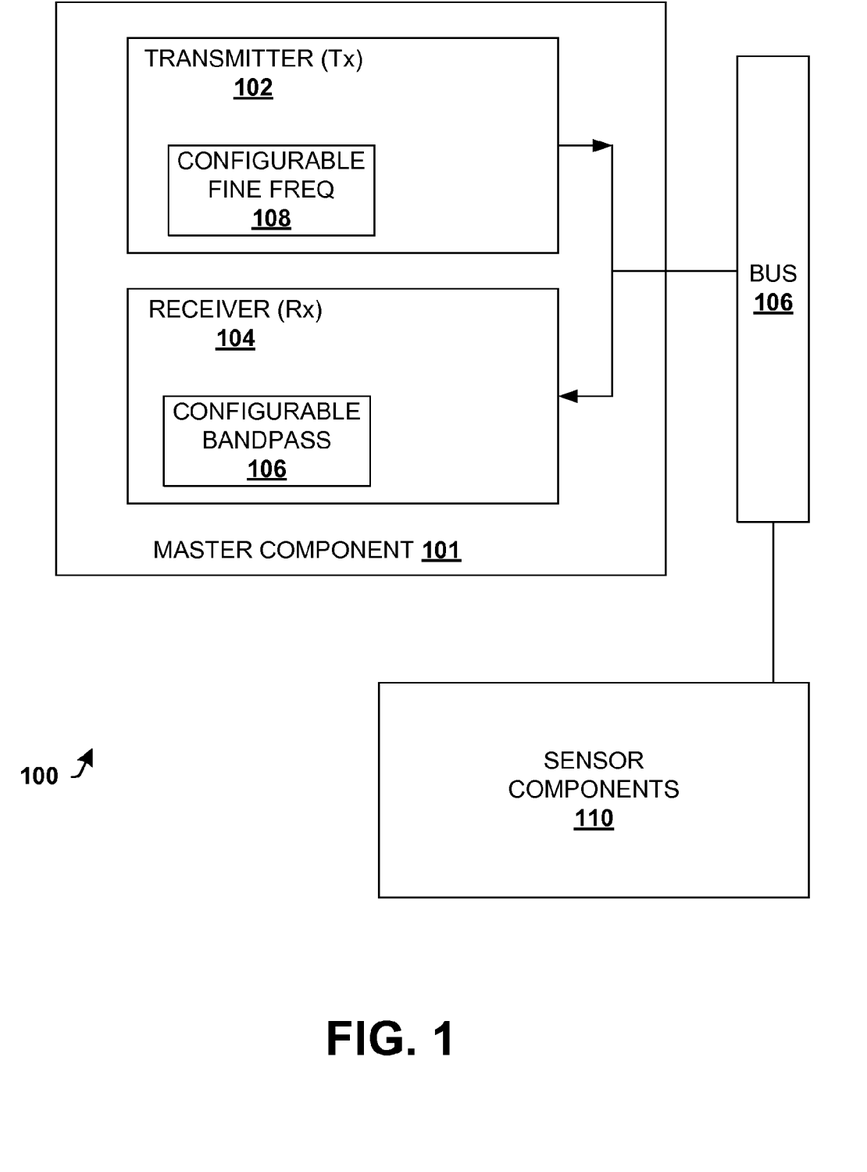
FIG. 1 is a diagram illustrating a communication system that uses modulation and relatively narrow pass bands for data transmission.

FIG. 1 is a diagram illustrating a communication system 100 that uses modulation and relatively narrow pass bands for data transmission. The system 100 configures transmission frequency and receiver bandpass filtering according to sensor components within the system so that relatively narrower frequency bands can be utilized.

The system 100 can be used for automotive systems and the like to facilitate data transmission, power consumption, and data integrity.

The system 100 includes a master component 101, a data bus 106, and a plurality of sensor components 110. The master component 101 is coupled to a data bus 106. The master component 101 transfers data with other components, including the plurality of sensor components 110, via the data bus 106. The master component 101 selects a suitable frequency bin, which has an associated center frequency, for each frame for communication and then performs the communication via the bus 106.

Generally, the center frequency is used at both ends to modulate data for signals to be transmitted and to bandpass filter received signals. The center frequency is used for modulation of data sent by the master component (master out) and data sent to the master component (master in), where it is modulated by the sending component or sensor component.

The selected frequency bin is typically varied per frame and can be selected from a list of available channels or bins. Generally, the frequency bin, and its associated center frequency, is selected to mitigate noise and/or interference.

The master component 101 establishes communication using the selected center frequency with one or more of the sensor components 110. However, the master component 101 modifies the transmission frequency and its bandpass filter to enhance communication. As a result, communication is improved without changes or enhancements to the sensors 110.

The bus 106 is a suitable communication medium and includes, for example, two wire and four wire implementations. The bus 106 is coupled to a plurality of components including the sensor components 110.

The master component includes a transmitter component 102 and a receiver component 104. The transmitter component 102 includes a configurable fine frequency component 108 and the receiver component 102 includes a configurable bandpass filter 106.

The frequency component 108 is configured to adjust or modify the transmission frequency, based on the selected center frequency, according to communication characteristics or variations from ideal values. These characteristics include receiver characteristics at a receiving end of data transmitted by the transmitter component 102, environmental conditions such as temperature, inaccurate components/ circuits, and the like. As a result, the transmitter 102 generates transmission data at the modified or shifted transmission frequency.

It is noted that on the receiving or far end, there are characteristics/variations that impact the frequencies used in modulation and bandpass filters. These variations can cause the data transmission to be faulty, noisy and/or weaker. For example, analog components at a sensor can change parameters of sensor's bandpass filter. The frequency component 108 modifies the center frequency to provide the transmission of data at a frequency more compliant or tailored to the receiver. Thus, the provided signal is stronger and, as a result, a narrower band can be utilized because the modified center frequency at least partially compensates for variations on the receiving end.

As stated above, the master component 101 also includes the configurable bandpass filter 106 as part of the receiver 104. The configurable bandpass filter 106 is adjusted or shifted to alter its passband. In one example, the bandpass filter 106 includes a switched capacitor array which can be configured to provide the shifted passband. The passband is shifted to a shifted center frequency, which is varied from the selected center frequency by a shift amount. The shift amount at least partially compensates for identified frequency shifts in master in signals and is determined according to communication characteristics including variations at the far end, environmental conditions, and the like. Some examples of determining the bandpass filter shift amount are provided below.

The use of the fine frequency component 108 and the configurable bandpass filter 106 facilitate communication by permitting smaller pass bands, more frequency bins/channels (due to the smaller pass bands), and accommodate less accurate components/circuits within the system.

Figure 2:
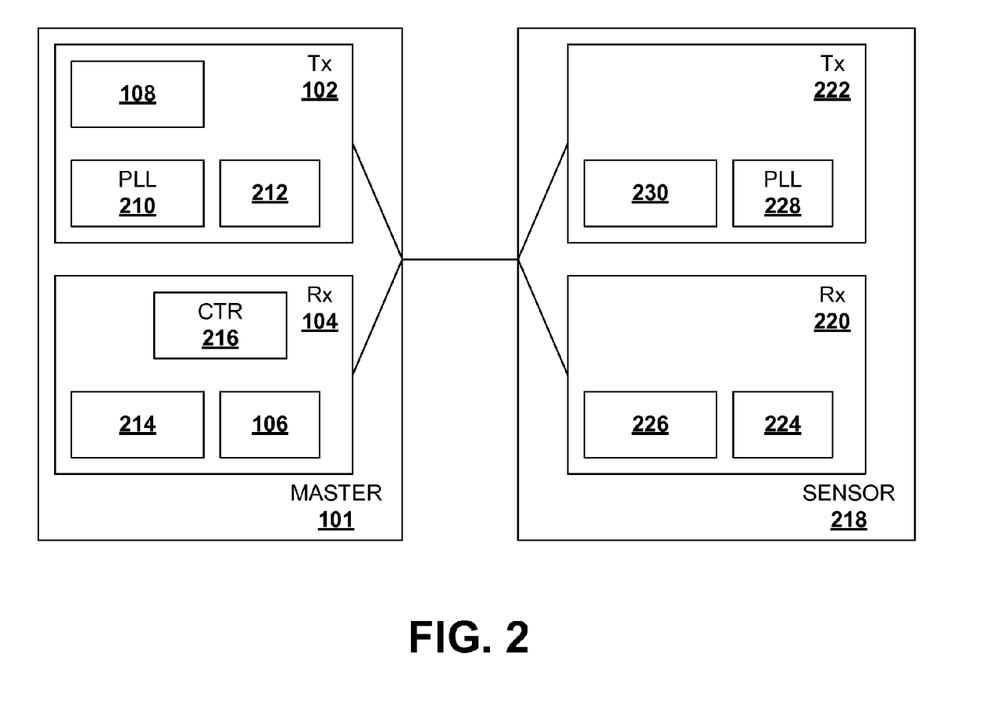
FIG. 2 is a block diagram illustrating a communication system having sensors and utilizes relatively narrow pass bands for data transmission.

FIG. 2 is a block diagram illustrating a communication system 200 having sensors and utilizes relatively narrow pass bands for data transmission. Center frequencies for transmission and receiving are adjusted at one end to at least partially account for variations in actual components and circuitry. Once accounted for, narrower frequency bands can be utilized for data transmission. The system 200 is similar to the system 100 described above and includes additional details.

The system 200 includes a master component 101 and a sensor component 218. The sensor component 218 is one of a plurality of sensor components (not shown) present in the system 200. The sensor component 218 and the master component 101 are exchanging data, in this example.

The sensor component 218 is a suitable sensor, such as an automotive sensor, such as tire pressure sensors, wheel speed sensor, radial sensor, temperature sensor, pressure sensor, flow rate sensor, and the like. The sensor component 218 typically measures some characteristic or characteristics, such as temperature, and provides the measurement to the master component 101. Additionally, the sensor component 218 can be controlled by the master component 101 to perform a task, such as adjusting a throttle, activating a motor and the like.

The master component 101 includes a transmitter 102 having a frequency configuration component 108, a PLL 210, and a modulation component 212. The master component 101 further includes a receiver 104 having a configurable bandpass filter 106, a demodulation component 214, and a receiver controller 216.

The slave/sensor component 218 includes a sensor transmitter 222 having a sensor modulation component 230 and a sensor PLL. The sensor component 218 further includes a receiver 220 having a band pass filter 226 and a demodulation component 224.

During operation, the master component 101 establishes two way communication with the sensor 218. The communications are established at a selected center frequency, which typically changes for every frame of data. The selected frequency includes a frequency band or frequency range in which communications should be.

The sensor component 218 transmits data to the master 101 (master in) by using the PLL 228 and the modulation component 230. The PLL 228 generates the selected center frequency and the modulation component 230 modulates data for transmission using the center frequency. Typically, process variations, conditions, and the like cause the actual frequency or sensor transmission frequency generated by the PLL 228 to vary from the selected center frequency. This actual frequency is referred to as the sensor center frequency. In one example, the actual frequency generated by the PLL 228 varies by 5 percent, positive or negative.

The sensor component 218 receives data (master out) from the master component 101 by using the sensor bandpass filter 226 and the demodulation component 224. The bandpass filter 226 is generally not adjustable and filters a master out signal to obtain a passband signal. The passband signal is provided to the demodulation component 224, which demodulates the passband signal and obtains demodulated data from the master component 101.

The master component 101 transmits data (master out) using the PLL 210 and the master modulation component 212. The transmitter 102 also includes the frequency configuration component 108, which adjusts the center frequency generated by the PLL 210 to be the modified center frequency instead of merely the selected center frequency. The frequency configuration component 108 adjusts the center frequency to account for variations, such as variations present in the PLL 210 and the sensor band pass filter 226. As a result, the modulation component 212 uses the modified center frequency for the frame of data. Techniques for modifying the center frequency suitable to be utilized by the configuration component 108 are discussed below.

The master component 101 receives data (master in) using the configurable bandpass filter 106 and the demodulation component 214. The configurable bandpass filter 106 is adjusted to account for variations, such as variations in the configurable bandpass filter 106 and the sensor PLL 228. Thus, the configurable bandpass filter 106 filters the master in signal, which was modulated using the sensor center frequency. The passed signal substantially includes the data from the sensor 218. The passed signal is provided to the demodulation component 214 for demodulating the passed signal and obtaining the data.

The filter controller 216 adjusts or shifts the passband of the bandpass filter 106. The controller 216 can measure or estimate shifts of the frequencies used by the master in signal from the sensor 218. The controller 216 then shifts the passband by an appropriate amount. The shifted passband of the configurable bandpass filter 106 is also referred to as the master modified passband. Techniques for adjusting or shifting the passband by the controller 216 are discussed below.

Figure 3A:
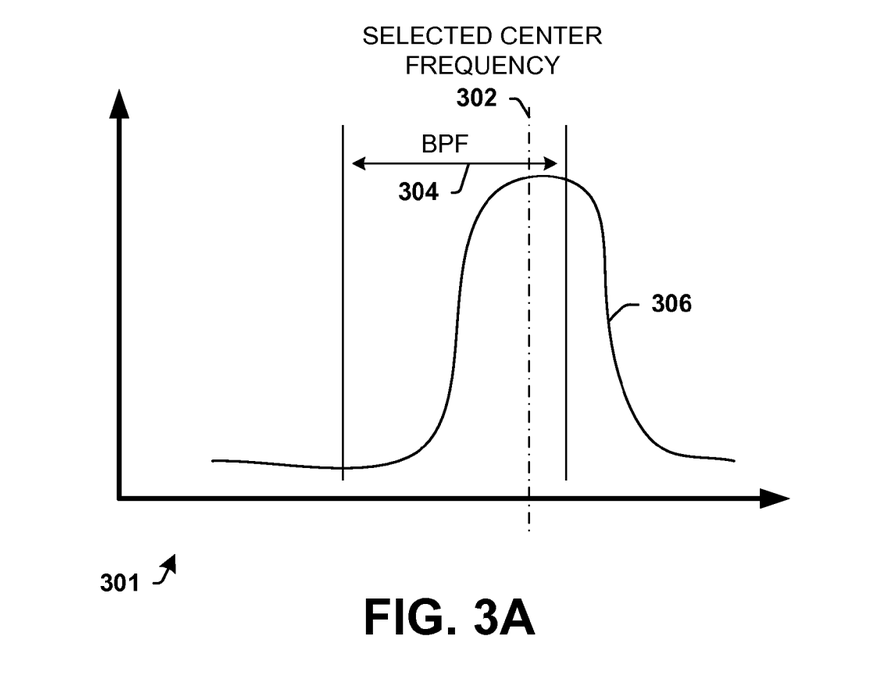
FIG. 3A is a graph illustrating filtering characteristics of a typical sensor bandpass filter with a non-modified transmit center frequency.
Figure 3B:
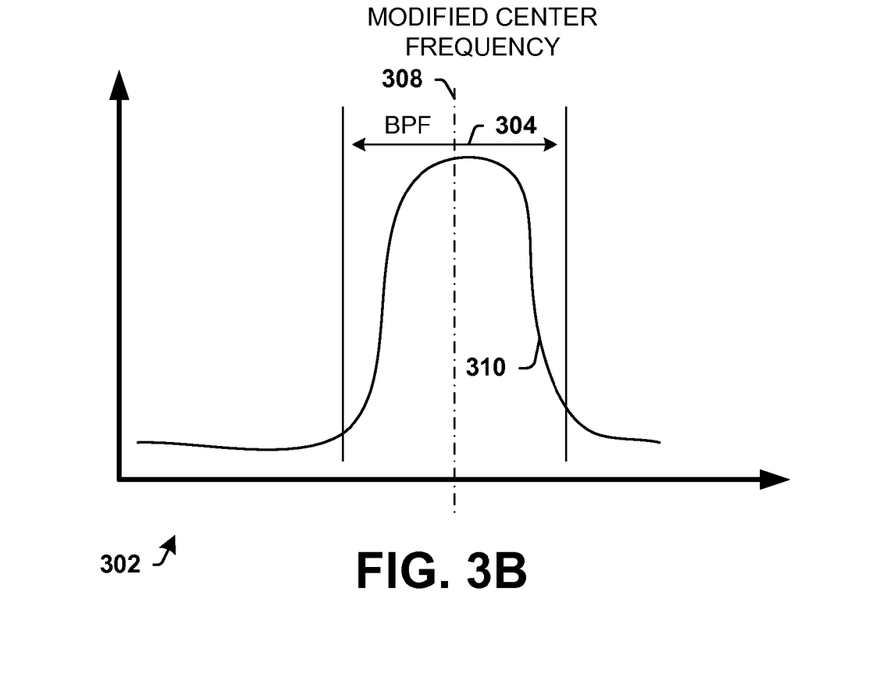
FIG. 3B is a graph illustrating filtering characteristics of a typical sensor bandpass filter with a modified transmit center frequency.

FIGS. 3A and 3B illustrate how a relatively narrow band pass filter can be utilized with a modified center frequency for communication systems. The figures are described with reference to the above description and FIG. 2.

FIG. 3A is a graph 301 illustrating filtering characteristics of a typical sensor bandpass filter for a master out signal with a non-modified transmit center frequency. The graph is provided for illustrative purposes and as an example to facilitate understanding.

The graph 301 includes an x-axis depicting frequency increasing from left to right and a y-axis depicting signal magnitude increasing from bottom to top. The graph 301 includes a received master out signal 306, which is generated by a master component. The signal 306 is generated using a selected center frequency 302. The selected center frequency 302 has not been adjusted. A passband 304 is shown for a sensor bandpass filter. As described above, the passband for a given filter can vary substantially, such as by 20% or more. In this example, the passband has shifted to the left and cuts out a substantial portion of the signal 306. As a result, a substantial amount of data can be lost.

One technique to account for such a shift and resulting loss of data is to enlarge the passband of the filter. However, doing so reduces the number of bins or channels available for transmission of data. Further, a larger passband is more likely to include unwanted noise and/or distortions.

As shown below, a filter configuration component, such as the component 108 described above, can be utilized to modify the center frequency such that the filter substantially passes the signal.

FIG. 3B is a graph 302 illustrating filtering characteristics of a typical sensor bandpass filter for a master out signal with a modified transmit center frequency. The graph is provided for illustrative purposes and as an example to facilitate understanding.

The graph 302 includes an x-axis depicting frequency increasing from left to right and a y-axis depicting signal magnitude increasing from bottom to top. The graph 302 also includes a received master out signal 310, which is generated by a master component. The signal 310 is generated using a modified center frequency 308. The modified center frequency 308 has been adjusted from the selected center frequency 302 to account for the shift in the passband. Techniques for identifying the shift and modifying the center frequency are described below.

Again, the passband 304 is shown for the same sensor bandpass filter. The passband 304 is shifted to the left as in FIG. 3A, however the modified center frequency 308 and the signal 310 fall substantially within the passband 304. As a result, the data from the master component can be obtained using the relatively small passband 304. Further, the likelihood of noise or distortions within the passband 304 is mitigated.

In the other direction, master in signals from sensors can encounter shifting of center frequencies as described above. Instead of the sensor adjusting its center frequency used in generating the master in signal, the master tunes or configures its bandpass filter to accommodate shifted master in signals.

Figure 4:
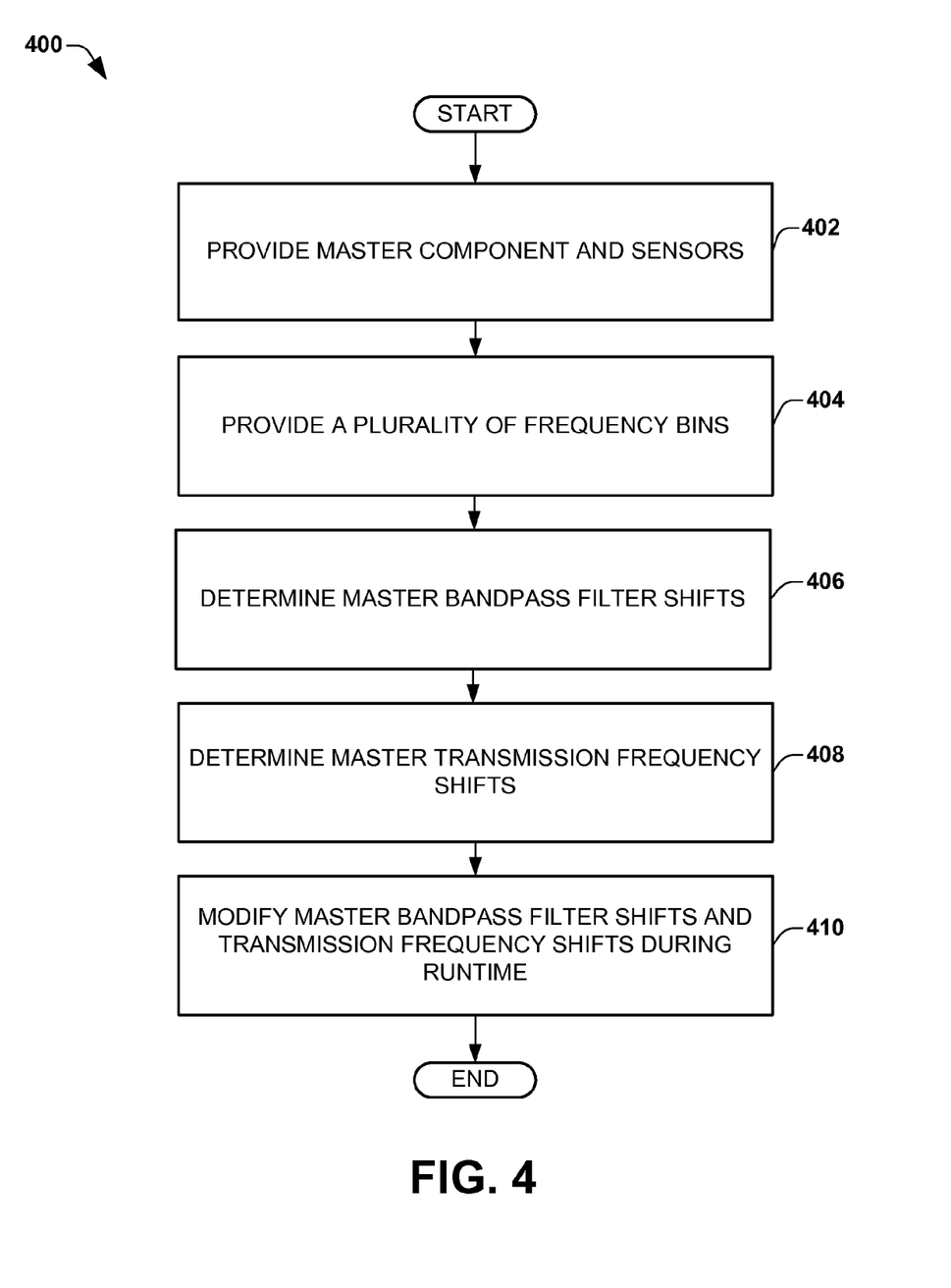
FIG. 4 is a flow diagram illustrating a method of modifying transmission frequencies and configuring bandpass filters in communication systems.

FIG. 4 is a flow diagram illustrating a method 400 of modifying transmission frequencies and configuring bandpass filters in communication systems. The method 400 modifies a center frequency used for transmission of data by a master component and configures a bandpass filter for receiving data by the master component to facilitate communication.

The method 400 begins at block 402, wherein a master component and a plurality of sensor components are provided. The master component is the master of the communication system and directs actions by the sensor components and obtained data, including measurements, from the sensor components. The plurality of sensors have a number of sensors greater than or equal to 1, thus range from 1 to the number of sensors.

A plurality of frequency bins are provided at block 404. The frequency bins are allocated frequency bands for communication. Generally, each bin has the same frequency range. The bins range from 1 to a number of bins. The bins include a center frequency.

A bandpass initialization phase is performed to determine a master bandpass filter shift for the plurality of sensors at the plurality of frequency bins at block 406. The bandpass filter shift includes a shift of a central frequency for the bandpass filter at the master component that increases signal strength. It is noted that the filter shift depends upon the frequency bin and the sensor. The filter shift information can be stored, for example, in a table.

In one example, a number of possible shift amounts are attempted for each bin to identify a suitable shift that yields a signal strength above a threshold value. For each possible shift, the sensor component sends a frame to the master component and the master component selects the bandpass shift that yields a signal strength that exceeds the threshold value.

A transmission frequency initialization phase is performed at block 408 to determine modified frequency shifts for transmission by the master component. The modified frequency shifts include determined shifts for the plurality of sensors at the plurality of frequency bins. In one example, the shifts are determined by determining a shift that yields a signal strength above a transmission threshold value.

In one example, a number of transmission frequency shifts are attempted for each bin to identify the transmission shift. Each of the possible shifts are used to send a frame from the master component to a current sensor component. The current sensor component reports back a signal strength of the sent frame. If the signal strength is above the transmission threshold value, the shift is utilized for that bin and that sensor.

The frequency shifts for transmission and the bandpass filter shifts are updated during transmission of data or runtime at block 410. The master component monitors signal strength of received data frames and response frames from sensor components to determine additional adjustments to the transmission frequency and the bandpass filter shifts. In one example, for master in communication, a sensor sends a data frame to the master component. The master component adapts its central frequency of its configurable bandpass filter to increase signal strength. For master out communication, the master component sends another frame to the sensor component, which reports in a response frame the signal strength. Based on the response frame, the master component adapts its transmit frequency.

Figure 5:
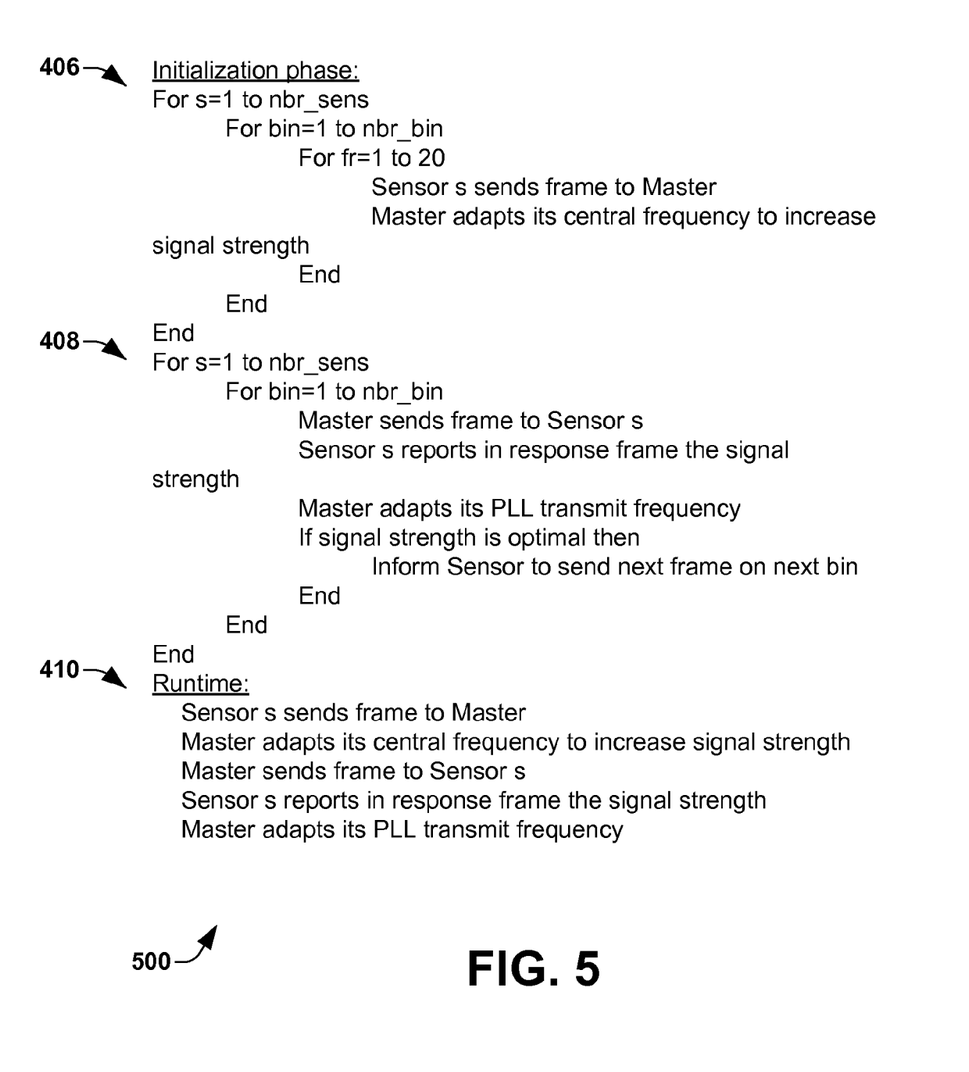
FIG. 5 is a diagram depicting an example of suitable pseudocode that can be utilized to implement the methods of modifying transmission frequencies and configuring bandpass filters.

FIG. 5 is a diagram depicting an example of suitable pseudocode 500 that can be utilized to implement the methods of modifying transmission frequencies and configuring bandpass filters, such as the method 400 and variations thereof. It is appreciated that suitable variations in the pseudocode 500 are contemplated.

A first portion of the code corresponds to block 406 where master bandpass filter shifts are determined. The portion includes nested "for loops" to test 1 to 20 shifts, in this example, for each frequency bin and for each sensor component. It is appreciated that other suitable numbers of shifts can be utilized. For each shift, the sensor component sends a test or data frame to the master component.

A second portion of the code corresponds to block 408 where master transmission frequency shifts are determined.

The portion also includes nested "for loops" to test the frequency bins on the plurality of sensor components. For each bin, the master component sends a test frame to a current sensor component. The sensor component responds/reports back with a response frame indicating the signal strength of the received test frame. If the signal strength is optimal (is above a threshold value), the adapted transmit frequency is set for the current bin and the loop moves to a next frequency bin.

A third portion of the code corresponds to block 410 where bandpass filter shifts and transmission frequency shifts are made during runtime. A sensor component sends a frame to the master component. The master component adapts/modifies its central frequency for a bandpass filter to increase signal strength based on the received frame. The master component sends a frame to the sensor component. The sensor component responds with a response frame indicating signal strength. The master component then adapts/modifies its transmit frequency based on the response frame.

Figure 6:
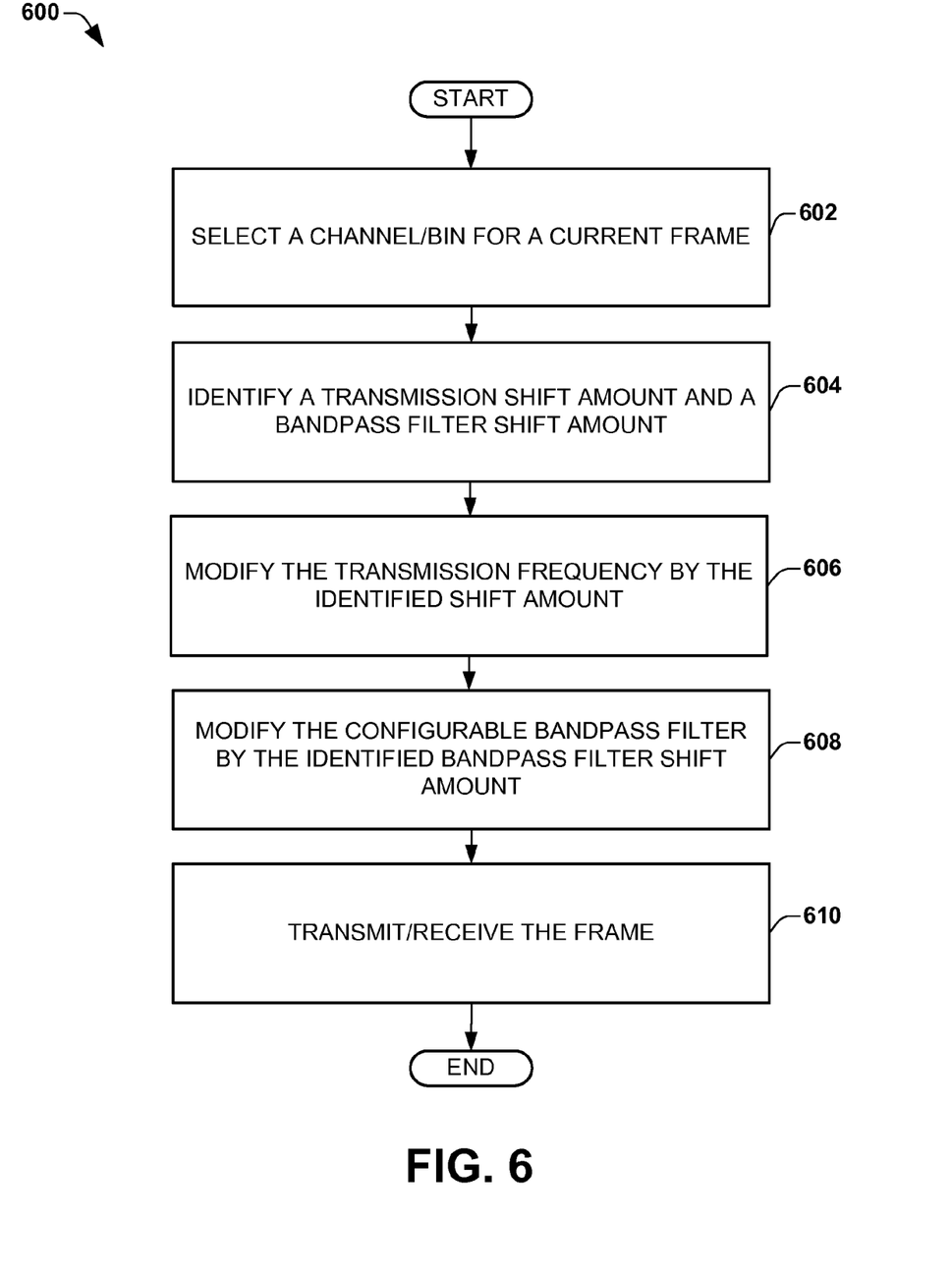
FIG. 6 is a flow diagram illustrating a method of communicating between a master component and one or more sensors.

FIG. 6 is a flow diagram illustrating a method 600 of communicating between a master component and one or more sensors. An initialization process has been performed to identify or determine suitable bandpass filter shift amounts and transmission frequency shift amounts for a plurality of frequency bins and the one or more sensor components.

The method begins at block 602 where a master component selects a frequency bin, also referred to as a channel, for a current frame. The frequency bin is one of a plurality of frequency bins. The current frame has a frame length, which may be specified by a number of bits. The frequency bin is also selected for a target or selected sensor component. The selected sensor component is one of the one or more sensor components.

A transmission frequency shift and/or a bandpass filter shift are identified at block 604. These are identified according to the selected frequency bin and the selected sensor component for the current frame.

The transmission frequency at the master component is modified by the identified transmission frequency shift at block 606. The shift is from the center frequency associated with the selected frequency bin for the current frame.

The configurable bandpass filter is modified by the bandpass filter shift amount at block 608. The bandpass filter has a passband defined for the selected frequency bin. The center frequency for the passband is shifted or modified by the filter shift amount.

The frame is exchanged at block 610 between the master component and the selected sensor component. For master out communication, the frame is transmitted using the modified transmission frequency. For master in communication, the frame is received and filtered at the master component using the modified bandpass filter.

While the above methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, 3, etc., are non-limiting examples of system that may be used to implement methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A communication system having a configurable bandpass filter is disclosed. The system includes a bandpass filter and a bandpass controller. The bandpass filter has an adjustable center frequency. The bandpass controller is configured to identify a frequency shift in a master in or received signal and to shift the center frequency of the bandpass filter according to the identified frequency shift.

A communication system having a configurable bandpass filter includes a master component and a sensor component. The sensor component is coupled to the master component and is configured to generate the master in signal and to receive the master out signal. The master component includes a transmitter component and a receiver component and is configured to select a center frequency of a plurality of frequency bins for a frame of data. The transmitter component is configured to generate the master out signal at a modified frequency varied from the selected center frequency by a first shift amount. The receiver component is configured to filter the master in signal at a filter frequency varied from the selected center frequency by a second shift amount.

A method of operating a system having a configurable bandpass filter is disclosed. A plurality of frequency bins for communication are provided. A plurality of sensor components are provided. Bandpass filter shifts are determined to improve master in signal strength for the plurality of frequency bins and the plurality of sensor components. Transmission frequency shifts are determined to improve master out signal strength for the plurality of frequency bins and the plurality of sensor components.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:
1. A communication system having configurable bandpass filter, the system comprising:
 a transmitter component configured to transmit a frame at a transmission center frequency to a sensor;

a bandpass filter of a receiver having an adjustable center frequency; and a controller configured to identify a frequency shift based on sensor characteristics in a received signal from the sensor and to shift the center frequency of the bandpass filter and modify the transmission center frequency according to the identified frequency shift, wherein the received signal is from the sensor external to the system and provided in response to the transmitted frame.

2. The system of claim 1, wherein the sensor characteristics at least partially represents variations in a transmission component of the sensor component configured to generate the received signal.

3. The system of claim 1, wherein the sensor characteristics include variations in a phase locked loop of a transmission component of the sensor component used to generate the received signal.

4. The system of claim 1, wherein the bandpass controller is further configured to shift the center frequency of the bandpass filter by an additional shift amount according to component variations in the bandpass filter.

5. The system of claim 1, wherein the bandpass filter initially has a passband associated with a selected center frequency, but offset from the selected center frequency due to component variations in the bandpass filter.

6. The system of claim 1, wherein the bandpass filter and the bandpass controller are in a receiver component of a master component.

7. The system of claim 6, further comprising a plurality of sensor components coupled to the master component via a bus.

8. The system of claim 7, wherein one of the plurality of sensor components is the sensor.

9. The system of claim 1, further comprising a frequency configuration component configured to modify the transmission center frequency based on component variations in a sensor band pass filter.

10. The system of claim 1, further comprising a frequency configuration component configured to modify the center frequency generated by a phase locked loop component of the transmitter component.

11. The system of claim 1, wherein the bandpass filter generates a passed signal from the received signal.

12. The system of claim 11, further comprising a demodulation component configured to demodulate the passed signal into received data.

13. The system of claim 1, wherein the received signal indicates a signal strength of the transmitted frame as received at the sensor.

* * * * *